(12) United States Patent
Ueyama

(10) Patent No.: US 8,557,396 B2
(45) Date of Patent: Oct. 15, 2013

(54) COPPER-ALLOY-BASED SLIDING MATERIAL, AND COPPER-ALLOY-BASED SLIDING MEMBER

(75) Inventor: Masanori Ueyama, Hirakata (JP)

(73) Assignee: Komatsu Ltd., Tokyo (JP)

( * ) Notice: Subject to any disclaimer, the term of this patent is extended or adjusted under 35 U.S.C. 154(b) by 916 days.

(21) Appl. No.: 12/531,952

(22) PCT Filed: Apr. 24, 2008

(86) PCT No.: PCT/JP2008/057943
§ 371 (c)(1),
(2), (4) Date: Sep. 18, 2009

(87) PCT Pub. No.: WO2008/136355
PCT Pub. Date: Nov. 13, 2008

(65) Prior Publication Data
US 2010/0050375 A1    Mar. 4, 2010

(30) Foreign Application Priority Data

Apr. 26, 2007    (JP) .................................. 2007-116296

(51) Int. Cl.
| | |
|---|---|
| *B32B 15/04* | (2006.01) |
| *B32B 15/18* | (2006.01) |
| *B32B 15/20* | (2006.01) |

(52) U.S. Cl.
USPC ........... 428/677; 428/627; 428/676; 428/548; 16/2.1; 420/470

(58) Field of Classification Search
USPC ......... 428/627, 687, 674, 676, 684, 685, 671, 428/677, 548, 551, 552, 553, 558, 557, 564
See application file for complete search history.

(56) References Cited

U.S. PATENT DOCUMENTS

| | | | |
|---|---|---|---|
| 6,197,432 B1* | 3/2001 | Fujita et al. .................... | 428/553 |
| 2003/0209103 A1* | 11/2003 | Takayama et al. .............. | 75/231 |
| 2007/0009756 A1* | 1/2007 | Miyamoto et al. ............. | 428/618 |
| 2007/0009757 A1* | 1/2007 | Takayama et al. ............. | 428/644 |

FOREIGN PATENT DOCUMENTS

| | | | |
|---|---|---|---|
| JP | 62-133043 | * | 6/1982 |
| JP | 61-019750 A | | 1/1986 |
| JP | 2001-003123 A | | 1/2001 |
| JP | 2002-060869 A | | 2/2002 |
| JP | 2002-285262 A | | 10/2002 |
| JP | 2002-295473 A | | 10/2002 |
| JP | 2004-307960 A | | 11/2004 |

* cited by examiner

*Primary Examiner* — Michael La Villa
(74) *Attorney, Agent, or Firm* — Global IP Counselors, LLP

(57) ABSTRACT

In the copper-alloy-based sliding material, alloy steel particles containing fine carbides are dispersed in a range of 1 to 20 wt % of the total weight into a Cu-based matrix containing 5 to 15 wt % of Sn, and the copper-alloy-based sliding material has a Vickers hardness in a range of 44 to 148 as a macro hardness.

8 Claims, 7 Drawing Sheets

COPPER-ALLOY-BASED SLIDING MATERIAL, AND COPPER-ALLOY-BASED SLIDING MEMBER

CROSS-REFERENCE TO RELATED APPLICATIONS

This national phase application claims priority to Japanese Patent Application No. 2007-116296, filed on Apr. 26, 2007. The entire disclosure of Japanese Patent Application No. 2007-116296 is hereby incorporated herein by reference.

TECHNICAL FIELD

The present invention relates to a copper-based sliding material and a copper-alloy-based sliding member, and particularly relates to a copper-alloy-based sliding material and a copper-alloy-based sliding member wherein the material does not contain lead and seizing resistance and surface pressure resistance are improved.

BACKGROUND ART

Recently, to adapt to use under stricter sliding conditions in bearings used in automobiles, construction machines, agricultural machines, and the like, there has been a demand for the development of a copper-alloy-based sliding material as a bearing material having high load resistance as well as superior adhesion resistance and seizing resistance. In addition, to reduce environmentally burdening substances, there is a demand for the development of a copper-based sliding material that does not contain lead.

Among conventional materials for bearings in the travel components of a construction machine, a Cu—Sn—Pb (lead bronze)-based material, e.g., Cu-10Sn-10Pb (LBC-3) has been used as a material having improved seizing resistance and satisfactory sliding characteristics (see Japanese Laid-Open Patent Application No. 2002-295473 (paragraph 0003), for example).

However, since the aforementioned lead bronze-based material contains lead, it is believed that in cases in which oil leaks from the bearings, Pb also flows out with the oil into the environment, and the burden on the environment increases. The need for environmental concern has particularly increased of late, and there is a demand for a sliding material that does not contain Pb. Therefore, Ag and Bi have been proposed as materials replacing Pb (see Japanese Laid-Open Patent Application No. 2002-60869 (claims 1 and 2), for example).

Another consideration has been to provide an overlay of a resin or another nonmetal material as a sliding layer over the sliding surfaces, thereby ensuring the break-in characteristics and seizing resistance normally provided by Pb (see Japanese Laid-Open Patent Application No. 2004-307960 (paragraph 0002), for example).

Another proposal has been a copper-based sliding material wherein a large amount of graphite, molybdenum disulfide, or another solid lubricant is mixed into bronze, ensuring seizing resistance and high lubrication. However, this copper-based sliding material does not sinter well, and high mechanical strength cannot be ensured.

There is also a technique for dispersing hard particles such as a ceramic powder into a soft metal matrix whose Sn content has been adjusted, the intention being to improve the abrasion resistance and break-in characteristics (low coefficient of friction) needed for the sliding material. However, this sliding material has a drawback in that due to insufficient bond strength between the soft metal matrix and the hard particles as well as the large difference in hardness, a phenomenon occurs in which the hard particles flake off, and the flaked-off hard particles adversely affect the other shafts and instead reduce sliding performance.

SUMMARY OF THE INVENTION

Ag and Bi have been proposed as replacement materials for Pb as previously described, but if the soft metals of Ag and Bi are used simply as a replacement for Pb, a seizing resistance as great as that of Pb cannot be expected. Specifically, with the soft metals of Ag and Bi, the expected degree of seizing resistance and surface pressure resistance will be no more than that of currently available products, and the quality required for sliding conditions that are more severe that those currently encountered cannot be achieved. Furthermore, Ag and Bi have much higher material costs than Pb.

If an overlay is provided as a sliding layer over the sliding surfaces as previously described, then when the overlay is only a resin, the overlay has problems in that load resistance and abrasion resistance are insufficient, the overlay cannot be used in severe sliding conditions, and the usage conditions are limited. Furthermore, since heat radiation is poor, another problem encountered is that the oil temperature rises, for example.

The present invention was devised in view of such circumstances, and an object thereof is to provide a copper-alloy-based sliding material and a copper-alloy-based sliding member wherein the material does not contain lead and seizing resistance and surface pressure resistance are improved.

To resolve the problems described above, in the copper-alloy-based sliding material according to the present invention, alloy steel particles containing fine carbides are dispersed in a range of 1 to 20 wt % of the total weight into a Cu-based matrix containing 5 to 15 wt % of Sn, and the copper-alloy-based sliding material has a Vickers hardness in a range of Hv 44 to 148 as a macro hardness.

In the copper-alloy-based sliding material according to the present invention described above, the alloy steel particles preferably have a Vickers hardness in a range of Hv 225 to 430.

In the copper-alloy-based sliding material according to the present invention, it is also possible for the Cu-based matrix to contain 2 wt % or more and 10 wt % or less of the total weight of one or two substances selected from Mo-based intermetallic compounds, Fe-based intermetallic compounds, and solid lubricants.

In the copper-alloy-based sliding material according to the present invention, the solid lubricant may be molybdenum disulfide or graphite.

In the copper-alloy-based sliding material according to the present invention, it is also possible for the average particle size of the fine carbides to be 1 μm to 5 μm, and for the fine carbides to contain at least one of $M_6C$-based fine carbides, $M_7C_3$-based fine carbides, and MC-based fine carbides.

In the copper-alloy-based sliding material according to the present invention, the alloy steel particles preferably include high-speed tool steel particles.

The copper-alloy-based sliding material according to the present invention described above can also be used for a bushing in a track roller used as a mechanism for rotating and holding a crawler for enabling a construction machine to travel.

The copper-alloy-based sliding member according to the present invention comprises a steel plate and a sliding layer.

The sliding layer is formed on the steel plate and is composed of the copper-alloy-based sliding material as described above.

The copper-alloy-based sliding member according to the present invention comprises a steel plate and a copper-alloy-based sliding sintered layer. The copper-alloy-based sliding sintered layer is formed on the steel plate and is sintered and bonded using a mixed powder. The mixed powder is a powder obtained by mixing 1 to 20 wt % of an alloy steel powder containing fine carbides of the total weight into a Cu alloy powder containing 5 to 15 wt % of Sn. The alloy steel powder has a Vickers hardness in a range of Hv 225 to 430.

DETAILED DESCRIPTION OF THE PREFERRED EMBODIMENTS

Embodiments of the present invention are described hereinbelow with reference to the drawings.

Figure 1:
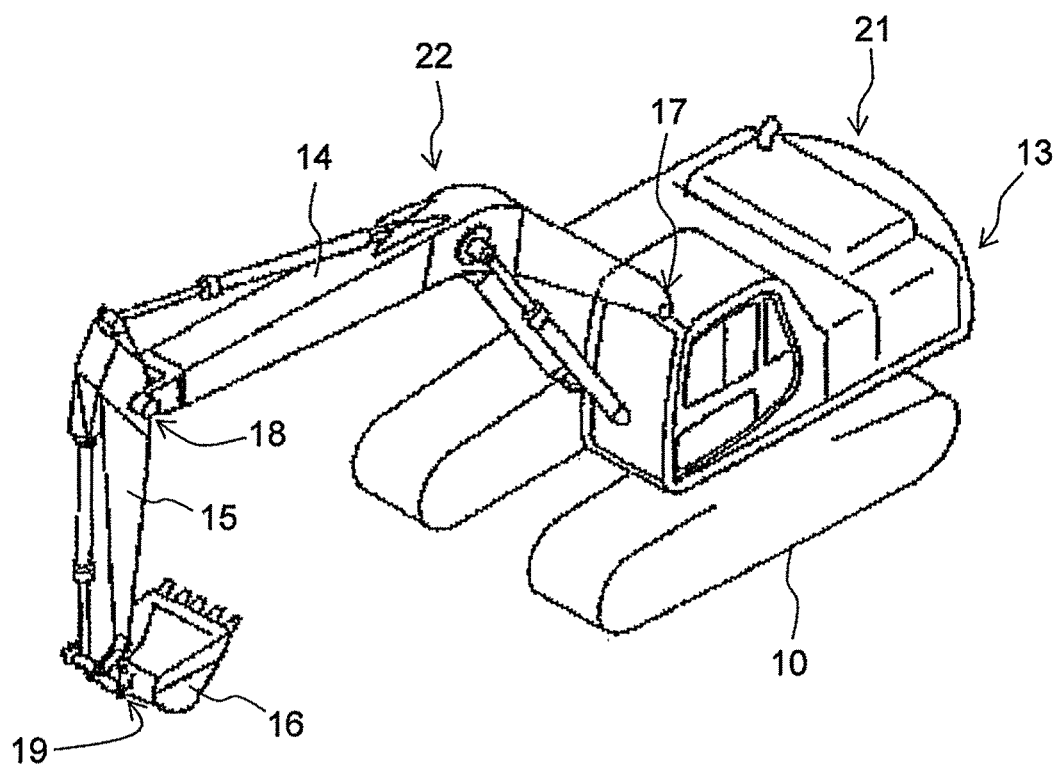
FIG. 1 is a perspective view showing an entire hydraulic shovel as an example of a construction machine according to an embodiment of the present invention.
Figure 2:
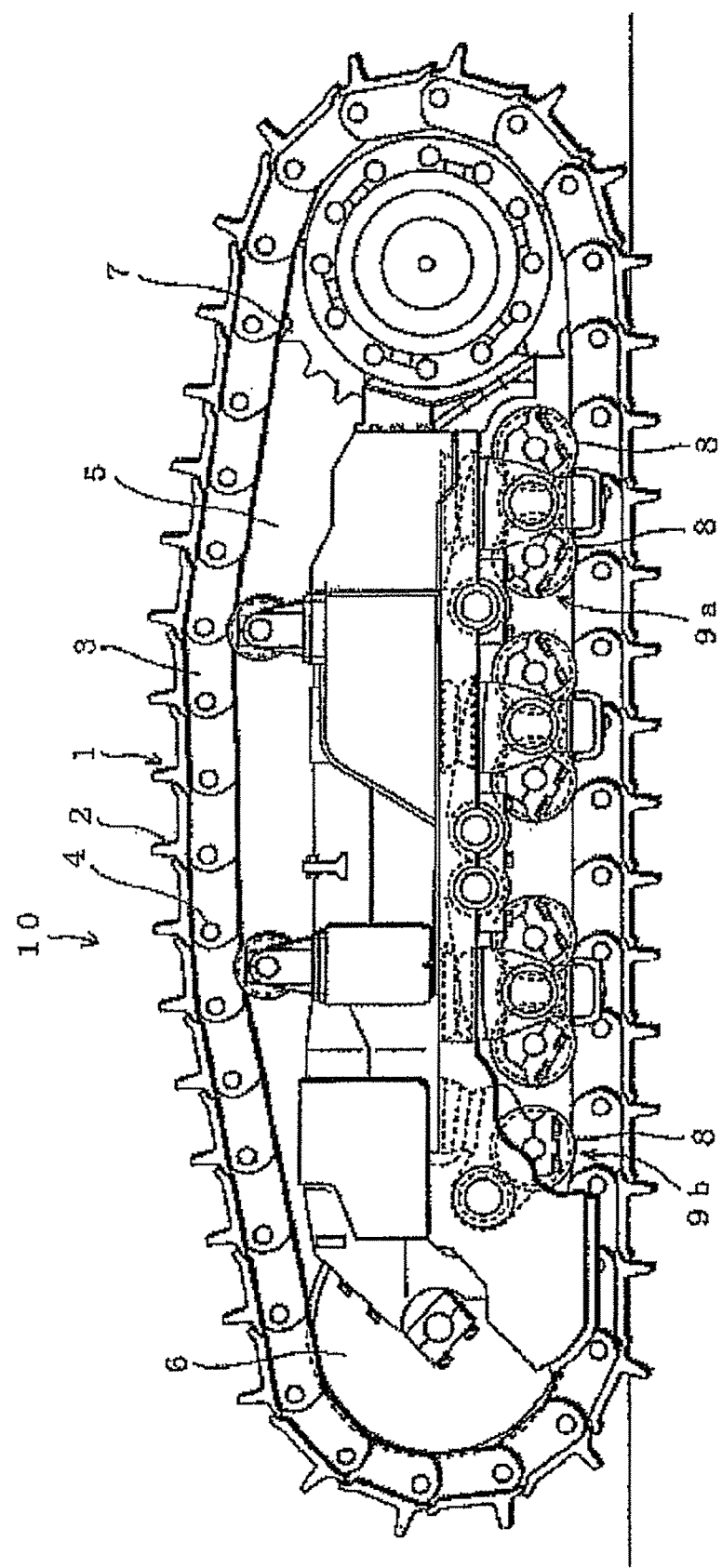
FIG. 2 is a structural drawing showing a travel apparatus provided with the crawler shown in FIG. 1.
Figure 3:
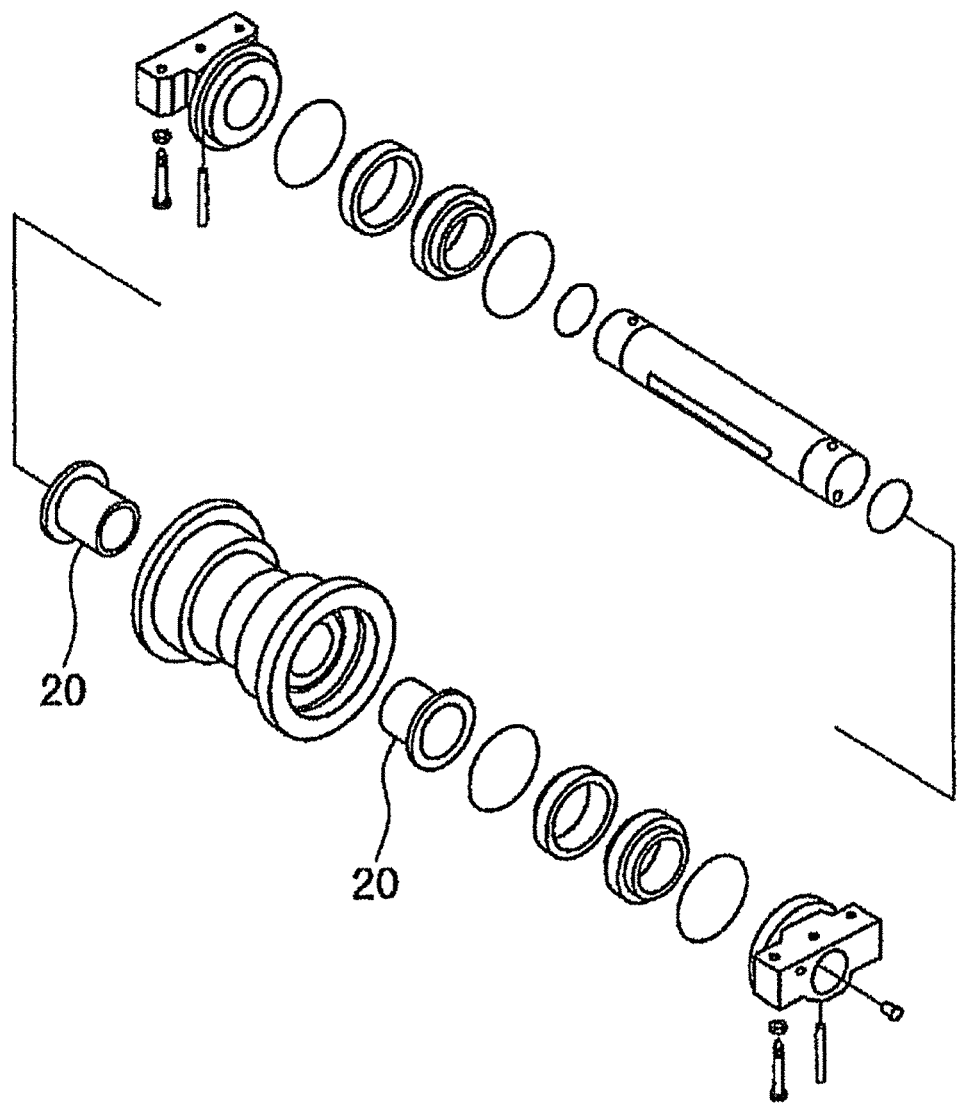
FIG. 3 is a perspective view showing the bushing of a lower track roller.

FIG. 1 is a perspective view showing an entire hydraulic shovel as an example of a construction machine according to an embodiment of the present invention. FIG. 2 is a structural drawing showing a travel apparatus provided with the crawler shown in FIG. 1. FIG. 3 is a perspective view showing a bushing 20 of a lower track roller.

A work device 22 of a hydraulic shovel 21 according to the present embodiment is provided with an upper revolving body 13, and the upper revolving body 13 is linked to a boom 14 by a boom linking device 17, as shown in FIG. 1. The boom 14 is linked to an arm 15 by an arm linking device 18, and the arm 15 is linked to a bucket 16 by a bucket linking device 19. The hydraulic shovel 21 has a travel apparatus 10 provided with a crawler which enables travel.

A pair of left and right travel apparatuses 10 is set up at the bottom of the hydraulic shovel as shown in FIG. 2.

The travel apparatuses 10 have crawler tracks 1. The crawler tracks 1 are configured with crawler track links 3 linked in a ring formation by linking pins 4, the crawler track links being composed of track blocks 2 fastened by bolts or joined by welding.

The travel apparatuses 10 are provided with track frames 5 set up along the longitudinal direction of the vehicle, and idlers 6 and sprockets 7 rotatably attached at the front and back ends of the track frames 5. Provided between the idler 6 and sprocket 7 at the bottom of either track frame 5 are three lower track roller devices 9a, each having a pair of front and back lower track rollers 8, rotatably supported to be capable of swinging vertically; and a lower track roller device 9b having one lower track roller 8 rotatably supported to be capable of swinging vertically. The lower track rollers 8 of the lower track roller devices 9a, 9b are designed to roll due to coming in contact with the treads of the crawler track links 3.

The copper-alloy-based sliding material according to the present embodiment is used in a wound bush in a track roller which fulfills the function of holding and rotating a crawler for enabling a construction machine to travel. For example, the material is used in the bushing 20 of the lower track roller shown in FIG. 3.

Figure 4:
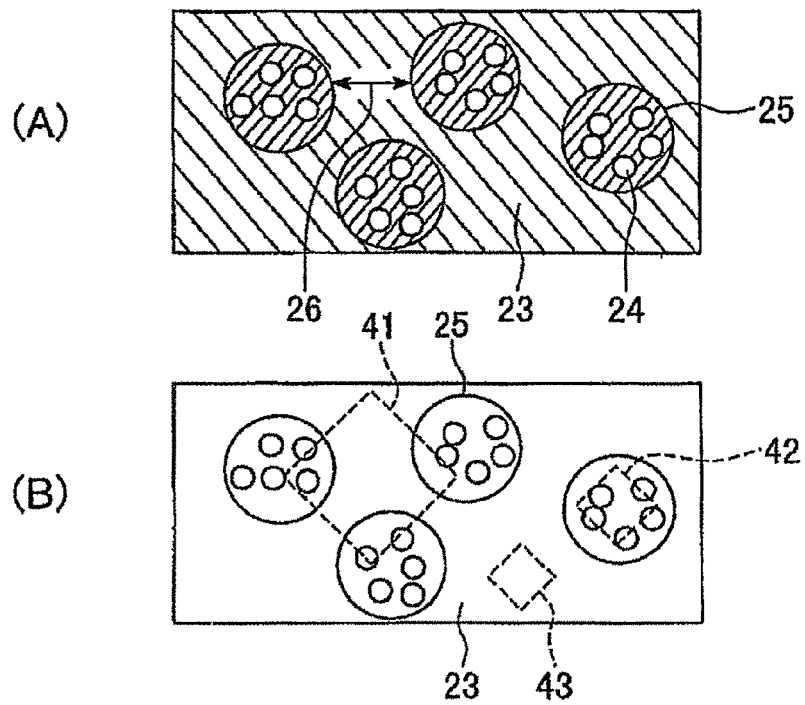
FIG. 4(A) is a drawing schematically depicting the composition of a sintered sample of the copper-alloy-based sliding material according to the present embodiment, and (B) is a drawing for describing the macro hardness of the copper-alloy-based sliding material, the hardness of the high-speed tool steel particles, and the hardness of the Cu-based matrix.

Next, the details of the copper-alloy-based sliding material will be described with reference to FIG. 4(A). FIG. 4(A) is a drawing schematically depicting the composition of a sintered sample of the copper-alloy-based sliding material according to the present embodiment.

The copper-alloy-based sliding material is a material in which high-speed tool steel particles 25, which are alloy steel particles containing fine carbides 24, are dispersed at a range of 1 to 20 wt % (more preferably a range of 5 to 15 wt %) of the total weight into a Cu-based matrix 23 containing 5 to 15 wt % Sn. Creating a composition in which the high-speed tool steel particles 25 are appropriately dispersed in the Cu-based matrix 23 yields a copper-alloy-based sliding material having improved load resistance, surface pressure resistance, and seizing resistance. In addition to the high-speed tool steel (SKH) particles 25, other possible examples of the alloy steel particles include alloy tool steel (SKD (for hot die steel), SKS (for cutting tools or cold die steel), and SKT (for hot die steel).

The average particle size of the fine carbides 24 is 1 μm to 5 μm, and the fine carbide 24 contain at least one fine carbide selected from $M_6C$, $M_7C_3$, and MC. For example, $(Fe,Mo)_6C$ is an example of an $M_6C$ based fine carbide; $Cr_7C_3$ is an example of an $M_7C_3$ based fine carbide; and WC, VC, and the like are examples of MC based fine carbides. The fine carbides 24 have a Vickers hardness of Hv 1500 to 2500. The method for measuring the particle size determines the particle size by the Feret's diameter from among the measurements of particle size taken with a microscope. The term "Feret's diameter" refers to a distance between two parallel lines of a specified direction that are tangent to a particle.

The reason for the average particle size of the fine carbides 24 being 5 μm or less is as follows. Since the fine carbides 24 are particles having a Vickers hardness exceeding 1000, there is a fear that the particles will have a severe effect on the other material during sliding. In view of this, the likelihood of the other material being affected can be reduced by keeping the average particle size of the fine carbides 24 at 5 μm or less.

Through heat treatment during sintering, the high-speed tool steel particles 25 are adjusted so as to have a Vickers hardness in a range of Hv 225 to 430. Therefore, not only is seizing of the material minimized when the copper-alloy-based sliding material is used in the sliding surfaces, but adverse effects on the shafts and other materials can be prevented, and surface pressure resistance can be sufficiently ensured.

The reason for having the hardness of the high-speed tool steel particles 25 in the range of Hv 225 to 430 is as follows. Since there are cases in which cast iron having a perlite structure is used as the other shaft during sliding, the hardness of the additives is preferably equal to or less than the hardness of the other shaft, considering the likelihood of the other shaft being affected. However, if the hardness is less than Hv 225, the effects of the high-speed tool steel particles are reduced, which are hard particles added in order to improve surface pressure resistance and abrasion resistance. In order to suppress the macro hardness of the copper-alloy-based sliding material to about Hv 148, the hardness of the high-speed tool steel particles is Hv 430, which may be added by up to approximately 20% by volume.

The results of measuring the hardness of the high-speed tool steel particles are shown in Table 1.

TABLE 1

Hardness Measurement Results

| Particle No | Hardness Hv | |
|---|---|---|
| 1 | 320 | |
| 2 | 289 | |
| 3 | 405 | |
| 4 | 365 | |
| 5 | 348 | |
| 6 | 276 | |
| 7 | 430 | Max |
| 8 | 318 | |
| 9 | 225 | Min |
| 10 | 375 | |
| average | 335.1 | |

The macro hardness of the copper-alloy-based sliding material has a Vickers hardness in a range of Hv 44 to 148. The reason for having the macro hardness of the copper-alloy-based sliding material in a range of Hv 44 to 148 is as follows. In cases of a macro hardness of less than Hv 44, there is a greater amount of self-abrasion and the parent metal deforms. In more severe conditions pertaining to deformation of the parent material, such as cases of a high surface pressure, the macro hardness is preferably Hv 75 or greater. If the macro hardness exceeds Hv 148, break-in characteristics are adversely affected, and the coefficient of friction increases, reducing surface pressure resistance.

FIG. 4(B) is a drawing for describing the macro hardness of the copper-alloy-based sliding material, the hardness of the high-speed tool steel particles, and the hardness of the Cu-based matrix.

The term "macro hardness of the copper-alloy-based sliding material" refers to the hardness measured by pressing an indenter 41 of a Vickers hardness tester into an area that contains both high-speed tool steel particles 25 and the Cu-based matrix 23. The term "hardness of the high-speed tool steel particles" refers to the hardness measured by pressing an indenter 42 of a Vickers hardness tester into the high-speed tool steel particles 25. The term "hardness of the Cu-based matrix" refers to the hardness measured by pressing an intender 43 of a Vickers hardness tester into an area of the Cu-based matrix 23 alone.

The average particle size of the high-speed tool steel particles 25 is preferably 150 μm or less, and more preferably 100 μm or less.

There are still sufficient advantages over conventional technique even in cases in which the average particle size of the high-speed tool steel particles 25 is finer at 5 to 20 μm. In other words, in cases in which the same wt % of high-speed tool steel particles 25 is added to the Cu-based matrix 23, when the average particle size is finer at 20 μm or less; there is a tendency for macro hardness to be lower, for the coefficient of friction to be lower, and for less heat to be generated during sliding than in cases in which the average particle size is greater than 20 μm.

The high-speed tool steel particles 25 are preferably dispersed at a degree of dispersion at which the interparticle distance 26 is 200 μm or less. Even in cases in which micro adhesion of the matrix 23 occurs, the adhesion is thereby stopped by the dispersion of the high-speed tool steel particles 25 and does not lead to macro adhesion. When the dispersion distance is 200 μm or greater, the role of stopping the progression of micro adhesion of the Cu-based matrix 23 cannot be fulfilled, and these effects are not achieved. It is more preferable that the interparticle distance 26 be 100 μm or less.

The reason for having the content of high-speed tool steel particles 25 in a range of 1 to 20 wt % is as follows. When the content of high-speed tool steel particles 25 is less than 1 wt %, all of the high-speed tool steel particles 25 are dissolved in the Cu-based matrix 23, resulting in a state in which the fine carbides 24 are only dispersed in the Cu-based matrix 23, and the effect of improving the seizing resistance of the high-speed tool steel particles 25 is lost. When the content of the high-speed tool steel particles 25 exceeds 20 wt %, the sliding layers composed of the copper-alloy-based sliding material become unyielding (hardness increases), therefore adversely affecting break-in characteristics and a reverse increase in the coefficient of friction, which is undesirable.

The reason for the Sn content being 5 to 15 wt % is as follows. In cases in which the copper-alloy-based sliding material is sintered and bonded to steel plates so as to create sliding members, liquid-phase sintering is performed in a temperature range at which both a solid and liquid exist; but when the Sn content is less than 5 wt %, the solidus/liquidus line is 900° C. or greater. During sintering at a temperature of 900° C. or greater, the deformation of the steel plates increases, and mechanical properties are reduced. Rolling is performed after the sintering and bonding in order to increase the density of the sintered product, but when Sn exceeds 15 wt %, the ease of rolling is markedly reduced, the rolling process becomes difficult, and densification of the sintered product cannot be facilitated. When Sn exceeds 15 wt %, the γ phase and the δ·η phase, which are intermetallic compound phases, are easily separated out from an equilibrium diagram. Therefore, in addition to the composition becoming brittle, the friction characteristics decrease as well.

The macro hardness of the copper-alloy-based sliding material is affected by both the content of the high-speed tool steel particles 25 and the Sn content. Consequently, it is necessary that the content of the high-speed tool steel particles 25 and the Sn content be established so as to fall within their respective aforementioned ranges and so that the macro hardness of the copper-alloy-based sliding material is in a range of Hv 44 to 148.

A conventional lead-laced bronze-based sliding member loses wear resistance under high surface pressure, the leaking or drying up of the lead when the sliding surfaces reach high temperatures makes it impossible to retain seizing resistance, and seizing occurs immediately at high temperatures and high surface pressures. In the copper-alloy-based sliding material according to the present embodiment, however, the high-speed tool steel particles 25 are appropriately dispersed in the Cu-based matrix 23, whereby the high-speed tool steel particles 25 form convexities and the soft Cu-based matrix 23 forms concavities. As a result, lubricating oil can be retained because these micro convexities and concavities are dispersed throughout the sliding surfaces, and the ease of oil lubrication can therefore be improved. The high-speed tool steel does not lose seizing properties even at high temperatures and high surface pressures and does not contain lead, bismuth, or other soft phases; therefore, these metals do not become source of fatigue under repetitive loads, and fatigue resistance is improved. Furthermore, the high-speed tool steel particles bond in the metallurgical sense with the Cu-based matrix, there are no problems with particles being sloughed off, and tensile strength and other mechanical properties can be sufficiently ensured.

Working Examples

The improvement in sliding characteristics (seizing-resistant surface pressure and amount of abrasion) was confirmed by a constant-speed friction and abrasion test when M2 powder (steel powder made by Mitsubishi; Fe-4Cr-5Mo-6W-1V-11C) as an example of high-speed tool steel powder was added to a Cu10Sn matrix. The hardness of the M2 powder is as shown in Table 1 above. Table 2 shows the compositions of the samples in Working Examples 1 to 29, the compositions of Comparative Examples 1 to 4, and the results of the constant-speed friction and abrasion tests. The evaluations were made collectively taking into account the coefficient of friction, surface pressure resistance, the amount of self-abrasion, and hardness.

TABLE 2

| | Base Material (Wt %) | | | Added Primary Element (Wt %) | | Added Secondary Element(Wt %) | | | | | | Constant-speed Friction and Abrasion Test Results | | | |
|---|---|---|---|---|---|---|---|---|---|---|---|---|---|---|---|
| | Cu | Sn | P | M2 | M2 (FP) | Mo | Fe—Mo | MoS2 | Copper-plated MoS2 | Graphite | Pb | Coefficient of Friction | Surface Pressure Resistance [kg/cm 2] | Amount of Self-abrasion [μm] | Macro Hardness [Hv] |
| Working Example 1 | remainder | 10 | 0.002 | 1 | | | | | | | | 0.125~0.105 | 600 | 33 | 90 |
| Working Example 2 | remainder | 10 | 0.002 | 10 | | | | | | | | 0.12~0.1 | 600 | 11 | 117 |
| Working Example 3 | remainder | 10 | 0.002 | 20 | | | | | | | | 0.13~0.12 | 600 | 10 | 140 |
| Working Example 4 | remainder | 10 | 0.002 | 1 | | | | 2 | | | | 0.12~0.13 | 600 | 148 | |
| Working Example 5 | remainder | 10 | 0.002 | 1 | | | | | 5 | | | 0.125~0.105 | 700 | 226 | |
| Working Example 6 | remainder | 10 | 0.002 | 5 | | | 2 | | | | | 0.14~0.115 | 700 | 18 | |
| Working Example 7 | remainder | 10 | 0.002 | 5 | | | | | 5 | | | 0.12~0.11 | 600 | 10 | |
| Working Example 8 | remainder | 10 | 0.002 | 10 | | 2 | | | | | | 0.125~0.12 | 700 | 20 | 125 |
| Working Example 9 | remainder | 10 | 0.002 | 10 | | | 2 | | | | | 0.13~0.115 | 700 | 10 | 120 |
| Working Example 10 | remainder | 10 | 0.002 | 10 | | | | 2 | | | | 0.12~0.115 | 600 | 30 | |
| Working Example 11 | remainder | 10 | 0.002 | 10 | | | | | 2 | | | 0.12~0.115 | 600 | 25 | |
| Working Example 12 | remainder | 10 | 0.002 | | 1 | | | | | | | 0.125~0.105 | 600 | 98 | 75 |
| Working Example 13 | remainder | 10 | 0.002 | | 5 | | | | | | | 0.12~0.11 | 600 | 31 | |
| Working Example 14 | remainder | 10 | 0.002 | | 20 | | | | | | | 0.12~0.11 | 700 | 16 | |
| Working Example 15 | remainder | 10 | 0.002 | | 5 | 5 | | | | | | 0.12~0.10 | 600 | 51 | |
| Working Example 16 | remainder | 10 | 0.002 | | 5 | | 5 | | | | | 0.12~0.11 | 700 | 17 | |
| Working Example 17 | remainder | 10 | 0.002 | | 5 | 5 | | | 5 | | | 0.12~0.1 | 700 | 28 | |
| Working Example 18 | remainder | 10 | 0.002 | | 10 | 2 | | | | | | 0.12~0.125 | 700 | 23 | 91 |
| Working Example 19 | remainder | 10 | 0.002 | | 10 | | 2 | | | | | 0.12~0.105 | 700 | 22 | 97 |
| Working Example 20 | remainder | 10 | 0.002 | | 10 | 5 | | 2 | | | | 0.12~0.10 | 700 | 21 | |
| Working Example 21 | remainder | 5 | 0.002 | 10 | | 2 | | | | | | 0.12~0.105 | 600 | 25 | 101 |
| Working Example 22 | remainder | 15 | 0.002 | 10 | | 2 | | | | | | 0.14~0.12 | 500 | 10 | 148 |
| Working Example 23 | remainder | 5 | 0.002 | 8 | | 2 | | | | | | 0.12~0.115 | 600 | 35 | 45 |
| Working Example 24 | remainder | 5 | 0.002 | 8 | | 2 | | | | | | 0.12~0.11 | 600 | 42 | |

TABLE 2-continued

| Base Material (Wt %) | | | Added Primary Element (Wt %) | | Added Secondary Element(Wt %) | | | | | | Constant-speed Friction and Abrasion Test Results | | | |
|---|---|---|---|---|---|---|---|---|---|---|---|---|---|---|
| | | | | | | | | Copper-plated | Graph- | | Coefficient of Friction | Surface Pressure [kg/cm 2] | Amount of Self-abrasion [μm] | Macro Hardness [Hv] |
| Cu | Sn | P | M2 | (FP) | Mo | Fe—Mo | MoS2 | MoS2 | ite | Pb | | | | |
| Working Example 25 | | | | | | | | | | | | | | |
| remainder | 5 | 0.002 | 5 | | 2 | | | | | | 0.125~0.115 | 600 | 37 | 44 |
| Working Example 26 | | | | | | | | | | | | | | |
| remainder | 5 | 0.002 | | 5 | 2 | | | | | | 0.125~0.115 | 600 | 47 | |
| Working Example 27 | | | | | | | | | | | | | | |
| remainder | 10 | 0.002 | 5 | | 2 | | | | | | 0.125~0.12 | 700 | 28 | 60 |
| Working Example 28 | | | | | | | | | | | | | | |
| remainder | 8 | 0.002 | 5 | | 2 | | | | | | 0.12~0.115 | 700 | 28 | 52 |
| Working Example 29 | | | | | | | | | | | | | | |
| remainder | 8 | 0.002 | 5 | | 2 | | | | 0.5 | | 0.12~0.115 | 700 | 30 | 50 |
| Comparative Example 1 | | | | | | | | | | | | | | |
| remainder | 10 | 0.002 | | | | | | | | | 0.13~0.12 | 300 | 44 | |
| Comparative Example 2 | | | | | | | | | | | | | | |
| remainder | 10 | | | | | | 10 | | | 10 | 0.115~0.1 | 500 | 376 | 78 |
| Comparative Example 3 | | | | | | | | | | | | | | |
| remainder | 5 | 0.002 | 1 | | | | 2 | | | | 0.12~0.1 | 500 | 260 | 40 |
| Comparative Example 4 | | | | | | | | | | | | | | |
| remainder | 15 | 0.002 | 15 | | 2 | | | | | | 0.15~0.12 | 400 | 8 | 160 |

Method for Creating Test Piece

Base material powders, added primary element powders, and added secondary element powders are weighed so as to have the constituents shown in Table 2. Next, the powders are mixed in a mixing device so as to be mixed uniformly. The base material powders herein are composed of mixtures of Cu powder, Cu20Sn powder, and phosphor bronze powder. M2 (FP) was also prepared as an added primary element powder in addition to M2 powder, which is the aforementioned high-speed tool steel powder. M2 (FP) is a high-speed tool steel powder having a small average particle size (fine powder). The chemical composition of M2 is shown in Table 3. The powder characteristics of M2 are shown in Table 4. The average particle size of the M2 powder is 150 μm or less, and the average particle size of the M2 (FP) is 45 μm or less. The added secondary element powders are composed of Mo, Fe—Mo, MoS2, copper-plated MoS2, graphite, or a mixture of two of these examples. The average particle size of powders of Mo, Fe—Mo, MoS2 is 5 μm or less. Copper-plated MoS2 having an average particle size of 45 μm or less was used. Graphite having an average particle size of approximately 100 to 150 μm was used.

TABLE 3

Units: % (Only O is in ppm)

| C | Si | Mn | P | S | Cu | Ni | Cr | Mo | V | W | O |
|---|---|---|---|---|---|---|---|---|---|---|---|
| 0.9 | 0.4 | 0.2 | 0.02 | 0.02 | 0.1 | 0.2 | 4.1 | 4.9 | 1.8 | 5.8 | 1200 |

Remnants: iron and unavoidable impurities

TABLE 4

| Particle Distribution (%) | | | | | | Apaprent Density g/cm³ (NL) | Flow Rate sec/50 g (NL) | Compression Density (g/cm³) 6 ton/cm³ (L) | Rattler Value (%) 6 ton/cm³ (L) |
|---|---|---|---|---|---|---|---|---|---|
| Greater than 150 μm | 150~100 μm | 100~75 μm | 75~60 μm | 60~45 μm | Less than 45 μm | | | | |
| 0.0 | 6.8 | 19.1 | 9.8 | 23.3 | 41.0 | 2.55 | 31.6 | 6.26 | 1.27 |

(NL): no lubricant added
(L): 1% zinc stearate added

Next, the mixed powders that have been mixed are scattered over steel plates.

Next, the mixed powders are sintered and bonded on the steel plates by sintering at a temperature in a range of 800° C. to 870° C. Sintered layers are thereby formed on the steel plates.

Next, rolling is performed on the sintered layers with a rolling reduction of 5 to 30% applied. The sintered layers are thereby densified. To further facilitate sintering and promote densification, the aforementioned steps of sintering at a temperature in a range of 800° C. to 870° C. and performing rolling at a rolling reduction of 5 to 30% may be repeated. Test pieces for the constant-speed friction and abrasion test are then cut out from the flat plates.

The test pieces of Working Examples 1 to 29 and the Comparative Examples were prepared in this manner.

Overview of Constant-Speed Friction and Abrasion Tester

Figure 5:
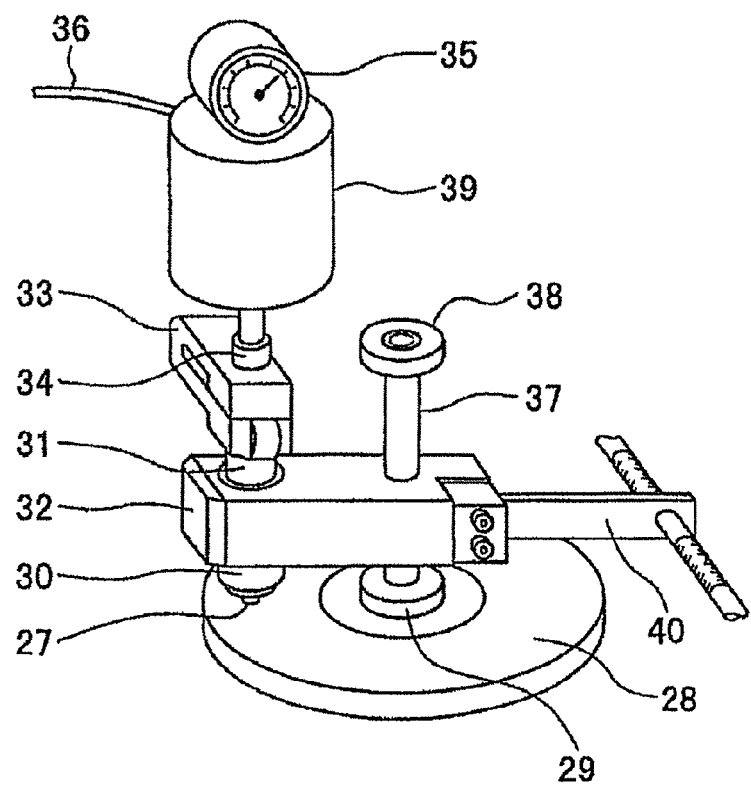
FIG. 5 is a schematic view of a constant-speed friction and abrasion tester.

FIG. 5 is a schematic view of the constant-speed friction and abrasion tester.

The constant-speed friction and abrasion tester has a sample disk 28 for pressing on a test piece (experiment piece) 27. The sample disk 28 is rotatably attached by free bearings 29, 38 and a free shaft 37. The test piece 27 is attached by an attachment socket 30. The attachment socket 30 is attached to a guide shaft 31, and the guide shaft 31 is held by a guide holder 32. The guide shaft 31 is connected to a Perrot cylinder 39 via a load cell (for measuring loads) 33 and a coupling 34, and an observational pressure gauge 35 and an air tube 36 are connected to the Perrot cylinder 39. The guide holder 32 also holds the free shaft 37 and a pending load cell (for measuring the coefficient of friction). A strain gauge 40 is attached to the guide holder 32, and a stopper is attached to the strain gauge 40. A material that will serve as the other material during sliding is used for the sample disk 28. The sliding surface area is a 5×5 mm square.

Constant-Speed Friction and Abrasion Testing Method

Figure 6:
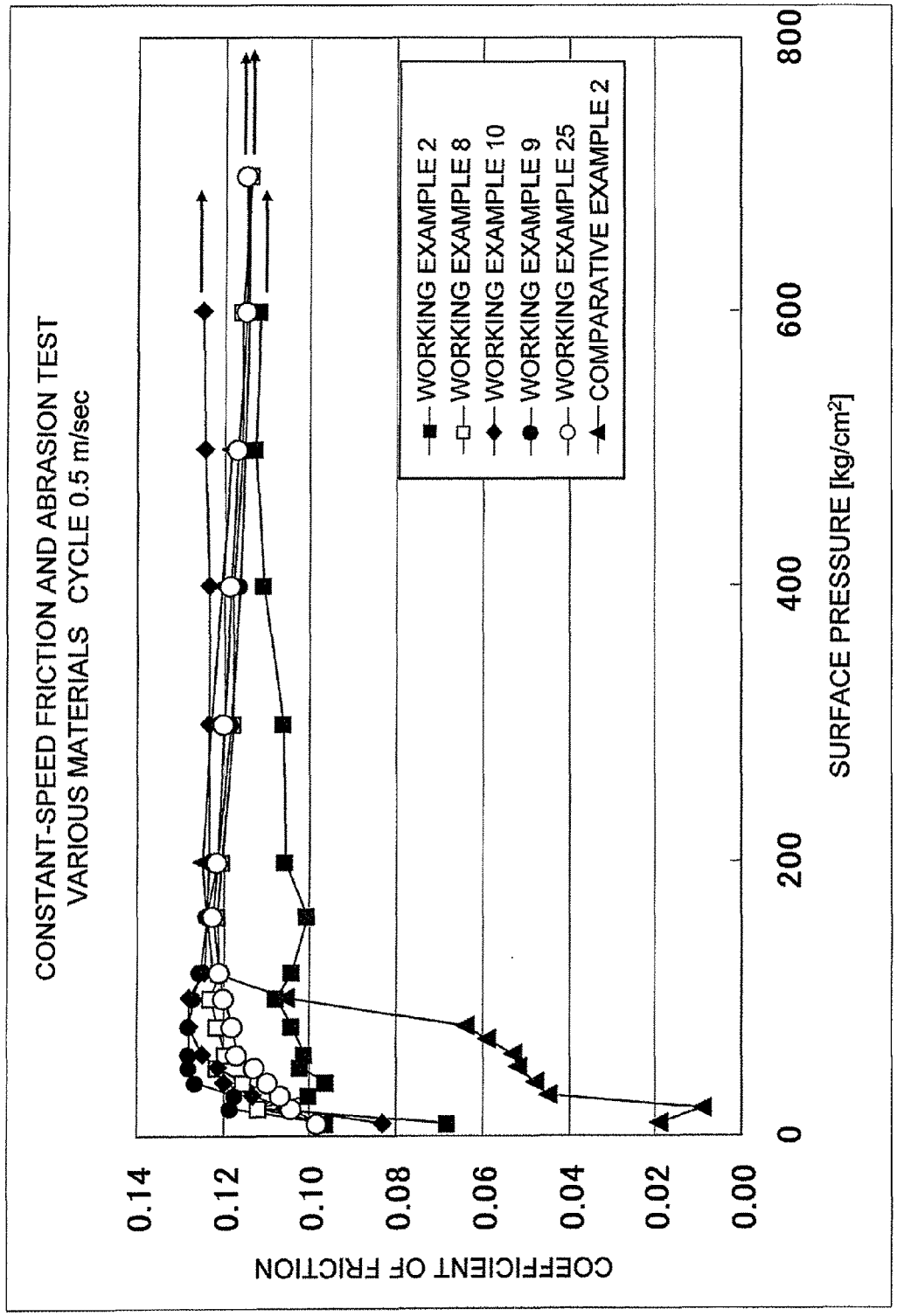
FIG. 6 is a diagram showing the relationship between seizing surface pressure and the coefficient of friction in the various samples fortified with M2.
Figure 7:
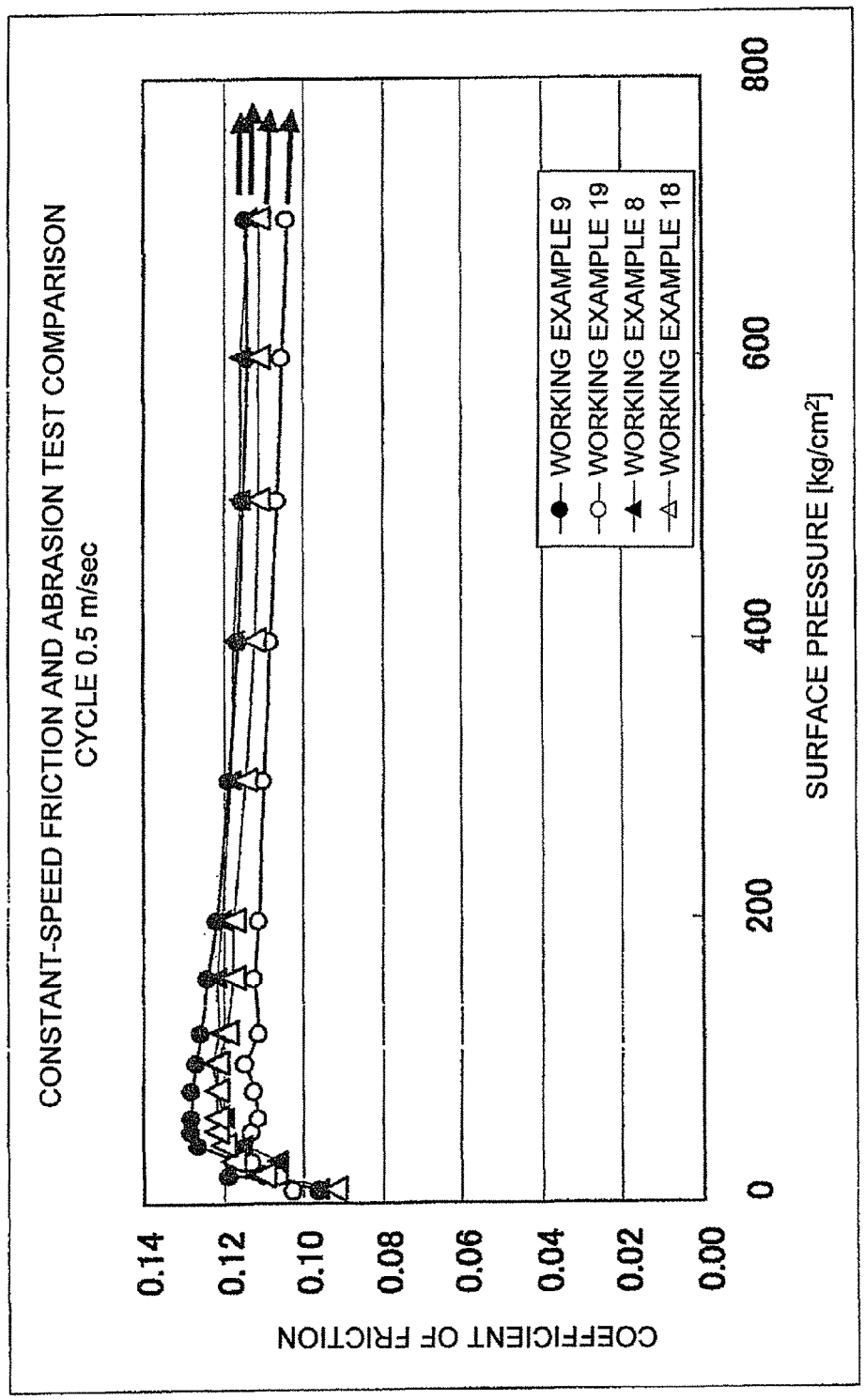
FIG. 7 is a diagram showing the relationship between surface pressure and the coefficient of friction for the various samples fortified with M2 (FP: fine powder)

In the constant-speed friction and abrasion tester shown in FIG. 5, the surface pressure was increased in steps to 10 to 800 kg/cm$^2$ while holding the test piece 27 pressed for 10 minutes under the loads shown in Table 5 against the sample disk 28 which rotated at a constant speed of 0.5 m/sec. The limit PV values were then measured, wherein seizing was considered to occur when the limit values for the coefficient of friction and the amount of abrasion were exceeded. The values of the coefficient of friction immediately before pressure was increased were measured. At this time, engine oil (Rimula D SAE 10W made by Showa Shell Sekiyu (K.K.)) at 80° C. was forcibly supplied to the sliding surface from the entire rotating sample disk 28. The test pieces after being tested were measured for the amount of abrasion. The results of performing the sliding test in this manner are shown in Table 2 and in FIGS. 6 and 7. FIG. 6 is a diagram showing the relationship between seizing surface pressure and the coefficient of friction in the various samples fortified with M2. FIG. 7 is a diagram showing the relationship between surface pressure and the coefficient of friction for the various samples fortified with M2 (FP: fine powder).

TABLE 5

| Load N kg | Surface Pressure W (kg/cm 2) | |
|---|---|---|
| 2.5 | 10 | |
| 5 | 20 | |
| 7.5 | 30 | |
| 10 | 40 | |
| 12.5 | 50 | |
| 15 | 60 | |
| 20 | 80 | |
| 25 | 100 | |
| 30 | 120 | |
| 40 | 160 | |
| 50 | 200 | |
| 75 | 300 | |
| 100 | 400 | |
| 125 | 500 | |
| 150 | 600 | |
| 175 | 700 | |
| 200 | 800 | Maximum Load |

In Table 2, the surface pressure resistances in the constant-speed friction and abrasion test results are the surface pressures (kg/cm$^2$) at the time the test was stopped because of the torque limit of the constant-speed friction and abrasion tester, and there was no seizing in Working Examples 1 to 29. The tests were stopped because of seizing in Comparative Examples 1 to 4. The units for the amount of self-abrasion are μm.

According to Table 2 and FIGS. 6 and 7, it was confirmed that by adding the M2 materials, the seizing surface pressure resistance was improved to two or more times that of Comparative Example 1 in which no M2 material was added. It was found that the suitable amount of M2 material added was 10 wt %, because this amount creates a balance between the coefficient of friction, surface pressure resistance, the amount of self-abrasion, and other characteristics. It was also found that by adding Mo, MoS$_2$, or FeMo, the seizing resistance could be improved, and there was a tendency for the coefficient of friction to decrease as well. It was also found that macro hardness decreased and break-in characteristics improved more with M2 powder of a small particle size than with M2 powder of a large particle size, and the coefficient of friction therefore tended to decrease. All of the Working Examples 1 to 29 were confirmed to have seizing resistance and abrasion resistance equal to or greater than those of Comparative Example 2.

Composition Photographs

Figure 8:
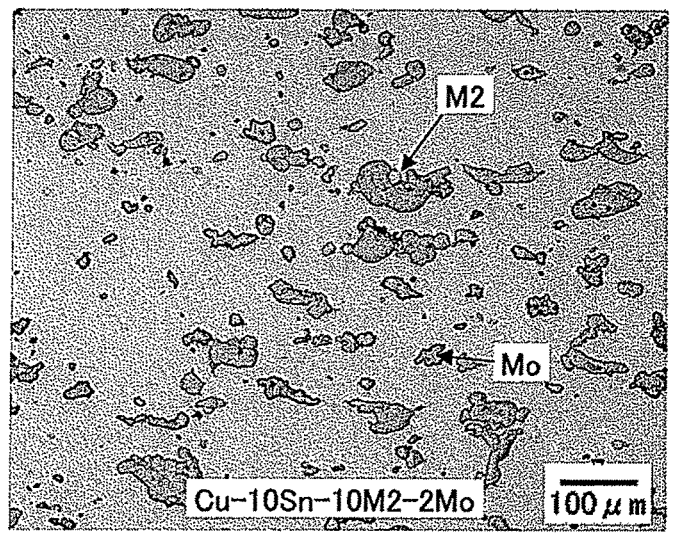
FIG. 8 is a photograph showing the composition of the copper-alloy-based sliding material in Working Example 8.
Figure 9:
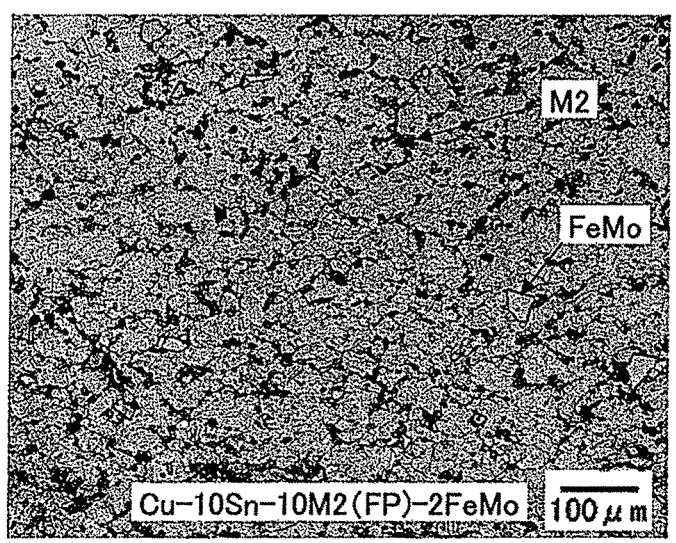
FIG. 9 is a photograph showing the composition of the copper-alloy-based sliding material in Working Example 19.

FIG. 8 is a photograph showing the composition of the copper-alloy-based sliding material in Working Example 8. FIG. 9 is a photograph showing the composition of the copper-alloy-based sliding material in Working Example 19.

Even in the case that the same wt % of M2 powder is added, when the particle size of the M2 powder added is small as shown in FIG. 9, it is believed that the likelihood of the other material being attacked can be reduced more so than in the case of a large particle size shown in FIG. 8.

The present invention is not limited to the embodiments and working examples described above, and various modifications can be made within a range that does not deviate from the scope of the present invention.

According to the present invention as described above, it is possible to provide a copper-alloy-based sliding material and a copper-alloy-based sliding member made of a material that does not contain lead, wherein seizing resistance and surface pressure resistance are improved.

The invention claimed is:

1. A copper-alloy-based sliding material comprising:
    a Cu-based matrix containing 5 to 15 wt % of Sn; and
    alloy steel particles dispersed in a range of 1 to 20 wt % of the total weight into the Cu-based matrix, the alloy steel particles having a Vickers hardness in a range of Hv 225-430,
    the alloy steel particles containing fine carbides having a Vickers hardness greater than Hv 1000,
    the copper-alloy-based sliding material including the Cu-based matrix, the alloy steel particles and the fine carbides having a Vickers hardness in a range of Hv 44 to 148 as a macro hardness,
    the Cu-based matrix, the alloy steel particles, and the fine carbides forming a structure in which the Cu-based matrix contains the alloy steel particles each of which contains the fine carbides.

2. The copper-alloy-based sliding material according to claim 1, wherein
    the Cu-based matrix contains 2 wt % or more and 10 wt % or less of the total weight of one or two substances selected from Mo-based intermetallic compounds, Fe-based intermetallic compounds, and solid lubricants.

3. The copper-alloy-based sliding material according to claim 2, wherein
    the solid lubricant is molybdenum disulfide or graphite.

4. The copper-alloy-based sliding material according to claim 1, wherein the average particle size of the fine carbides is 1 μm to 5 μm, and the fine carbides contain at least one of $M_6C$-based fine carbides, $M_7C_3$-based fine carbides, and MC-based fine carbides.

5. The copper-alloy-based sliding material according to claim 1, wherein the alloy steel particles include high-speed tool steel particles.

6. A bushing in a track roller for rotating and holding a crawler for enabling a construction machine to travel, the bushing comprising:

the copper-alloy based sliding material according to claim 1.

7. A copper-alloy-based sliding member comprising:

a steel plate; and a sliding layer formed on the steel plate and composed of the copper-alloy-based sliding material according to claim 1.

8. A copper-alloy-based sliding member comprising:

a steel plate; and a copper-alloy-based sliding sintered layer formed on the steel plate and sintered and bonded using a mixed powder, with the mixed powder being a powder obtained by mixing 1 to 20 wt % of an alloy steel powder containing fine carbides of the total weight into a Cu alloy powder containing 5 to 15 wt % of Sn, the alloy steel powder having a Vickers hardness in a range of Hv 225 to 430, the fine carbides having a Vickers hardness greater than Hv 1000, the Cu alloy powder, the alloy steel powder, and the fine carbides forming the copper-alloy-based sliding sintered layer in which the Cu alloy powder contains the alloy steel powder which contains the fine carbides.

\* \* \* \* \*